(12) United States Patent
Meyer et al.

(10) Patent No.: US 8,490,286 B2
(45) Date of Patent: Jul. 23, 2013

(54) MANUFACTURING PROCESS FOR A SECTION OF AIRCRAFT FUSELAGE IN COMPOSITE MATERIAL

(75) Inventors: Cedric Meyer, Fonsorbes (FR); Jocelyn Gaudin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 865 days.

(21) Appl. No.: 12/569,195

(22) Filed: Sep. 29, 2009

(65) Prior Publication Data
US 2010/0088896 A1 Apr. 15, 2010

(30) Foreign Application Priority Data
Sep. 30, 2008 (FR) ...................................... 08 56612

(51) Int. Cl.
*B21D 53/88* (2006.01)
(52) U.S. Cl.
USPC ................... 29/897.2; 29/897; 83/16; 83/34; 83/39; 83/56; 83/175

(58) Field of Classification Search
USPC .................. 29/897, 897.2; 83/16, 30, 34, 39, 83/56, 100, 175, 217, 282
See application file for complete search history.

(56) References Cited

U.S. PATENT DOCUMENTS

| 5,223,067 A | 6/1993 | Hamamoto |
| 6,575,064 B2 * | 6/2003 | Hart et al. ......................... 83/16 |
| 2006/0145049 A1 | 7/2006 | Blankinship |

OTHER PUBLICATIONS

French Search Report dated May 20, 2009.

* cited by examiner

*Primary Examiner* — Richard Chang
(74) *Attorney, Agent, or Firm* — Perman & Green, LLP

(57) ABSTRACT

The disclosed embodiments relate to a method for manufacturing an aircraft fuselage section of composite material that comprises the following operations manufacturing a one-piece section; cutting the section longitudinally; spreading apart two edges located on the two sides of the cut; reassembling the section and making a longitudinal joint with the two edges overlapping. The disclosed embodiments also relate to a section made in accordance with this method.

9 Claims, 3 Drawing Sheets

MANUFACTURING PROCESS FOR A SECTION OF AIRCRAFT FUSELAGE IN COMPOSITE MATERIAL

This application claims priority to French Application No. 08 56612 filed 30 Sep. 2008, the disclosures of which are incorporated herein by reference in its entirety.

BACKGROUND

The aspects of the disclosed embodiments relate to a method for manufacturing an aircraft fuselage section of composite material that permits the introduction of systems and elements of the aircraft and/or robots capable of installing these systems and elements into the interior of the section.

The disclosed embodiments find applications in the field of aeronautics and in particular, in the field of designing aircraft fuselage sections of composite material.

An aircraft fuselage is traditionally a tubular body with a skin fastened to an internal structure. The skin is made of metal panels mounted and fastened around the metal internal structure, called the internal skeleton of the aircraft. The various panels are made singly and then assembled with one another by an overlapping process to constitute a fuselage section. Several sections are assembled with one another to form the entire fuselage. Such a metal fuselage has the drawback of being heavy since it is wholly metallic. It also has the drawback of requiring joints between the metal panels and between the sections, which creates overlapping areas with excess thickness, further increasing the weight of the aircraft.

To reduce the weight of the fuselage, aerodynamic builders try to replace certain metal elements by elements made of composite material. Composite materials can be used to make one or more parts of an aircraft fuselage. These parts of the fuselage, called sections, are made from dry fiber sheets pre-impregnated with thermosetting resin. These fiber sheets are placed in molds and then heated. Under the action of heat, the resin polymerizes, which permits the fiber reinforcement to retain the shape of the mold.

Two methods are known at this time for making aircraft fuselage sections of composite material. A first method consists of making panels of composite material singly, which are then assembled by a technique of overlapping assembly, essentially similar to that described above for metal panels. FIG. 1 represents an example of an aircraft made from panels. In this figure, each $P_{number}$ reference corresponds to a fuselage panel. In this example, the sections $T_1$, $T_2$, and $T_3$ are each made from four panels.

A second method consists of making the sections of composite material from a single piece. Actually, the techniques for making the elements of composite material permit making parts with large dimensions and complex shapes. Accordingly, it is possible to manufacture a tapered portion of fuselage, or section. In this case, each section is made of a single part in a single step. These sections are called one-shot or single-piece sections. Such a section is manufactured from fiber sheets pre-impregnated with resin, wound around a mold that has the desired tapered shape. The mold can be a male mold with the shape of a tubular cylinder, for example. When the fiber sheets have been wound around the mold, they are heated and then cooled. After cooling, the skin of composite material is detached from the mold, either by sliding it off or by disassembling the mold.

In this method, each section is made as a unit. Several sections are then assembled with one another to make up the fuselage.

This method has the advantage of eliminating the phase of assembly by overlapping panels, which avoids the use of joining elements and the creation of excess thicknesses, thus reducing the total weight of the fuselage. It also permits having continuous fibers that are not cut off and that consequently show improved performance. It also has the advantage of not requiring any overlap between the longitudinal joints and the circumferential joints, which is often disadvantageous in terms of weight.

This method of manufacturing a one-piece section also has the advantage of being fast. Actually, winding on a male mold is fast, and the number of assembly operations, costly in terms of manufacturing steps, is reduced (no longitudinal joints).

This technology for manufacturing one-piece sections accordingly provides many advantages, in particular when a large number of fuselages are to be produced. However, it also has drawbacks. A first drawback relates to the assembly of two one-piece sections, which requires stringent manufacturing tolerances that are difficult to respect. More precisely, the perimeter of the two sections to be assembled has to rigorously identical; a defect of shape can be corrected by the flexibility of the composite material, but a difference in the perimeter can absolutely not be corrected. Actually, in contrast to metal panels, it is not possible in this procedure to disconnect certain panels, in other words to undo the joint of the panels, to flex the assembly, and compensate for any differences from the manufacture of each section.

Another drawback of this procedure concerns the installation of interior equipment (struts, floors, etc.) and internal systems (electric, hydraulic, or pneumatic systems) inside the section. Actually, all of these systems and equipment are installed in the interior of the section after the section is manufactured, via the lateral openings of said section, i.e. the two openings located at one end and the other of the section. The parts to be installed, installation robots, and even personnel have to enter the section through the lateral openings.

An example of a one-piece section is shown in FIG. 2. In this example, there is the skin 1 of the section and a lateral opening 3. Installation equipment and elements 2 are also shown, introduced into the skin 1 through the lateral opening 3. As shown in this figure, the lateral openings correspond to a closed circular cross section. The installation of equipment and systems accordingly proves to be difficult, in particular for voluminous elements.

SUMMARY

To remedy the drawbacks of the techniques described above, the disclosed embodiments propose a manufacturing method for a one-piece fuselage section in which, once the section is made, a cut is made over the entire length of said section to create a longitudinal opening on this section. This longitudinal opening in the circular cross section of the section facilitates the penetration of parts, personnel, and robots into the section.

This procedure also provides the advantage of relieving precision problems of the perimeter of the sections to be assembled.

More precisely, the disclosed embodiments relate to a method of manufacturing an aircraft fuselage section of composite material, wherein it comprises the following operations:
  manufacturing a one-piece section;
  cutting the section longitudinally;
  spreading apart two edges located on both sides of the cut;
  reassembling the section and production of a longitudinal joint with overlapping of the two edges.

This method of manufacturing may involve one or more of the following characteristics:

the section is cut linearly through the entire thickness and over the entire length of the section.

the cut is made on a lateral area of the section.

supplementary cuts are made to obtain a piece cut off to form a mini-panel.

the longitudinal joint is made by bringing together the two edges of the section and fastening them with overlapping of said edges.

internal systems and/or structural elements and/or means of installing these elements are installed in the section after the two edges are spread apart.

the diameter of the section before being cut is greater than the diameter of the section after reassembly, with the diameter before cutting being $D_{manufactured} = D_{design} + 15\Phi/\pi$, wherein $D_{design}$ is the diameter of the section after reassembly and $\Phi$ is the diameter of the fastening elements.

the diameter of the section before being cut is determined so as to integrate a manufacturing tolerance.

The disclosed embodiments also relate to an aircraft fuselage section of composite material made in accordance with the procedure described above.

The disclosed embodiments also relate to an aircraft that has at least one section made in accordance with the procedure described above.

DETAILED DESCRIPTION

The disclosed embodiments propose a method for manufacturing a fuselage section of composite material in which the section is cut longitudinally to provide a longitudinal opening between the two lateral openings.

According to the disclosed embodiments, the section of composite material is manufactured in a single piece by the procedure described above.

The procedure then proposes making a longitudinal cut on the section. This longitudinal cut is made through the full thickness of the skin of the section and over its entire length. In other words, the cut is through the entire thickness of the composite material along the axis X of revolution of the aircraft so as to create a cut linking the two lateral openings of the section.

This cut is made by means of a traditional cutting tool for parts made of composite material.

When the cut has been made, the edges of the skin located on the two sides of the cut can be spread apart. The margins of the skin of composite material located on each side of the cut are called "edges". This spreading apart of the edges widens the cut to permit the passage of robots or of parts related to the equipment and to the systems to be installed in the interior of the section.

Actually, when making a one-piece section, the internal structure of the aircraft is installed in the section after manufacturing the skin of composite material. The equipment and the structure can then be installed, depending on its bulk, either through the lateral openings of the section, or through the cut made between these two openings, or through the openings and the cut.

When the structural elements and the various internal systems have been installed, the installation robots are removed from the section through the lateral openings and/or the cut. It is then possible to close up the section by overlapping the two edges on one another to make a longitudinal joint on these superimposed edges. This longitudinal joint is an overlap joint made by a technique identical with that used to manufacture sections consisting of panels of composite material.

Figure 1:
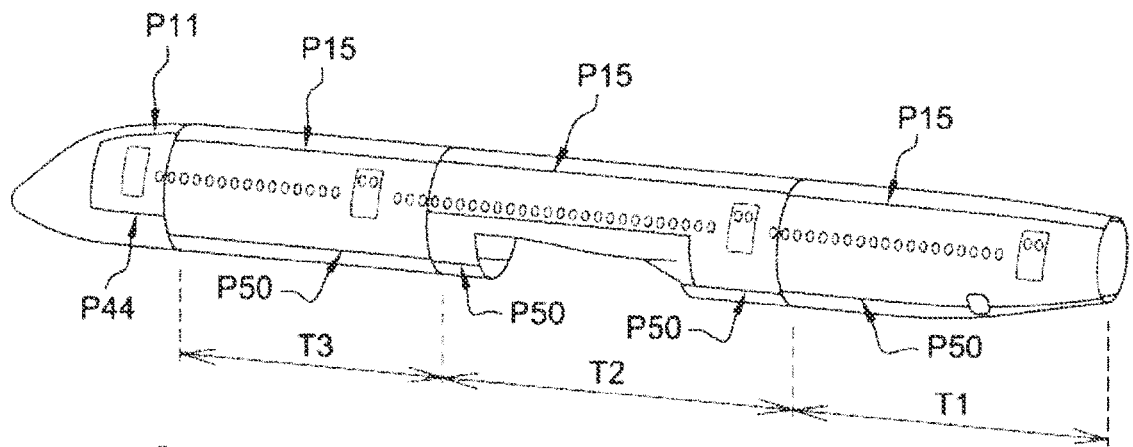
FIG. 1, already described, represents an example of a traditional aircraft fuselage section made up of multiple panels.
Figure 2:
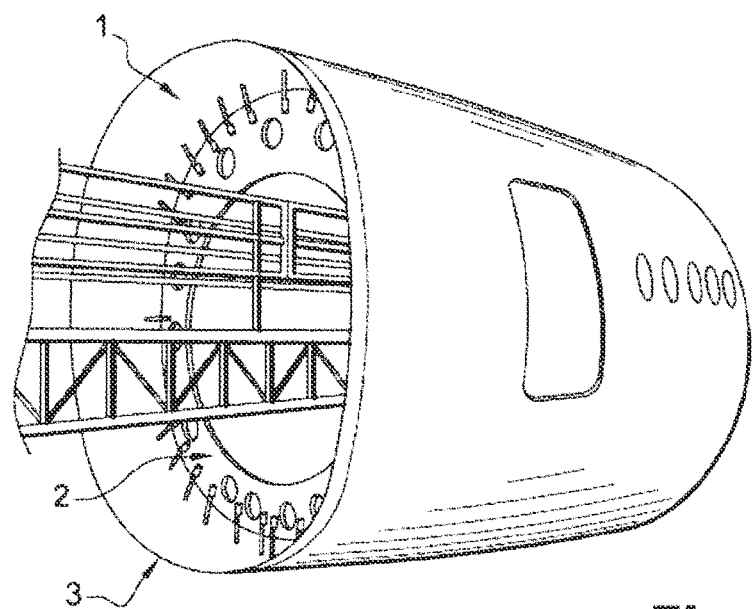
FIG. 2, already described, represents an example of a fuselage section of composite material made in one piece.
Figure 3:
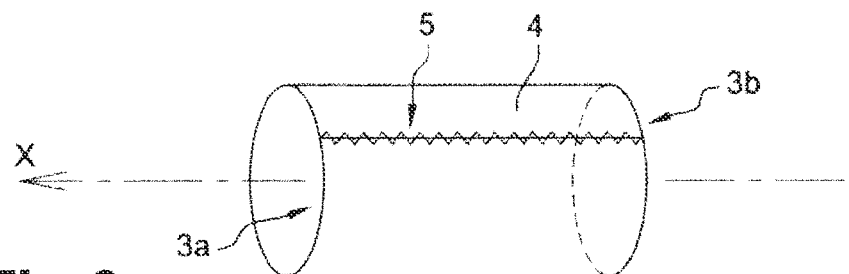
FIG. 3 represents schematically a fuselage section according to the disclosed embodiments with a lateral cut.

FIG. 3 represents schematically an example of a fuselage section according to the disclosed embodiments. This section 4 is represented by a cylinder placed along the axis X of revolution of the aircraft. This section has a first lateral opening 3a on the left and a second lateral opening 3b on the right. According to the disclosed embodiments, it has a cut 5 made by cutting along the axis X. As shown in FIG. 3, the cut 5 joins the lateral openings 3a and 3b.

Figures 4A, 4B:
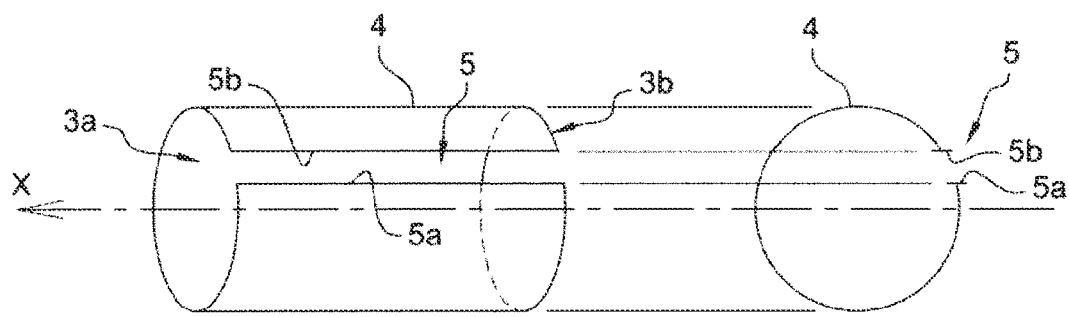
FIGS. 4A and 4B represent a fuselage section according to the disclosed embodiments after being cut and spread open.

FIGS. 4A and 4B represent the fuselage section 4 after making the cut 5 and spreading apart the edges 5a and 5b, located on either side of the cut. FIG. 4A shows a side view of this section 4 and FIG. 4B shows a front view of this same section 4.

As will be explained in further detail below, in the method of the disclosed embodiments each section is made in a single piece with a diameter noticeably larger than the desired diameter for the final section. Actually, the initial section is manufactured on a male mold with a cross section that has a diameter greater than the desired diameter of the final section, i.e. of the section that will later be assembled with the other sections to form the fuselage. This difference in diameter corresponds to the area of overlap of the margins of the cut necessary to make the joint of said margins. In other words, this difference in diameter provides for an overlap joint while fully restoring the mutual fit between sections.

In an embodiment of the disclosed embodiments, if structural elements, equipment, or robots are so bulky that they cannot pass through the cut and the lateral openings, supplementary cuts may be made in the skin of the section. These supplementary cuts can provide for obtaining a cut off part with a shape and size suitable for the element to be inserted.

The part cut off in this way forms a mini-panel, i.e. a panel that has reduced dimension relative to a traditional fuselage panel. As for the longitudinal cut, after installation of the internal systems and structures, the mini-panel is reassembled onto the cut section by the overlap joining technique described above.

While this embodiment requires two longitudinal joints, it nevertheless offers the advantage of being able to replace the mini-panel taken out by a mini-panel of a potentially different material. It is then possible, for example, to replace the mini-panel of composite material by a metal panel capable of assuring electrical continuity of the fuselage. Actually, to protect the aircraft and its passengers when the aircraft is struck by lightning, it is important to place all of the equipment of the aircraft at the same electrical potential and to ground all of this equipment to the metal elements of said aircraft by metallization, in order to drain the direct or indirect currents from the lightning. In the case of an aircraft with a metal fuselage, the lightning current is drained to the metal skin so that very little electrical current is injected into the interior of the aircraft. In the case of an aircraft with a fuselage made of composite material, the drainage of the lightning current is not provided by the skin itself. The airplane equipment then has to be grounded to the structure of the aircraft by metallization. Installation of a metal mini-panel according to this embodiment can help in the metallization of the airplane equipment.

Regardless of the embodiment of the disclosed embodiments, the cut is made in an area of the section that is under relatively little stress (in terms of forces) so as not to cause too much loss of weight in the longitudinal joint. Actually, a longitudinal joint in a very stressed area would entail the use of a large number of joining elements. To do this, a side area of the section is chosen, or at least an area other than the "keel" (lower part of the fuselage facing the ground), or the top of the fuselage (upper part of the fuselage opposite the "keel").

Figures 5A, 5B:
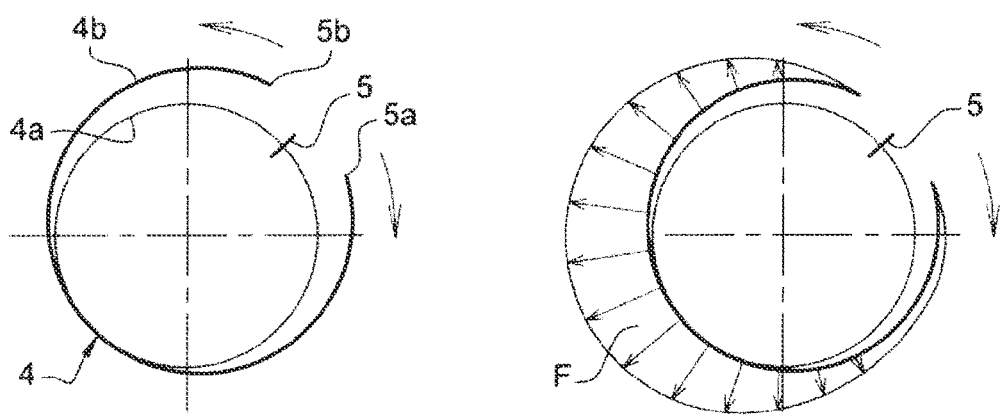
FIGS. 5A and 5B represent the cross section of FIGS. 4A and 4B, respectively, without and with the stresses due to being spread open.

To put this method in its place, the stresses placed on the section during the spreading apart of the two edges were evaluated. FIGS. 5A and 5B represent a cross section of the fuselage section before and after making the cut. FIG. 5A shows the section 4 before cutting (reference 4a) and after cutting (reference 4b). The cut section 4b is shown after spreading apart the edges 5a and 5b, each located on one margin of the section 4b, on both sides of the cut 5. In FIG. 5B, the same section profile is shown as in FIG. 5A with the addition of the stress field F, which is imposed on the section at the time it is spread open. The stress field is represented in this FIG. 5b by arrows perpendicular to the cross section of the section 4b. This FIG. 5B shows that the stress is maximum in the area of the section opposite the cut area.

The example shown in FIGS. 5A and 5B corresponds to a spreading of the edges sufficient to provide for the passage of a traditional installation robot, in other words a spread of the order of about 500 mm. As explained above, if this angular opening of 500 mm is not sufficient, a mini-panel can be cut off along the cut 5 according to the embodiment described above.

The feasibility of this spread was evaluated based on the theory of beams, for which the cut on the section is approximated as an opening with a width d on a cylinder with a perimeter of $2\pi R$, and length b. It is hypothesized that this opening on the cylinder is equivalent to a secured strip of length $\pi R$ and width b, whose deflection under the effect of the spreading action is b/2. Actually, at the point opposite that where the force is applied, there is perfect symmetry; accordingly, it can be considered that this secured hypothesis is consistent.

Figure 6:
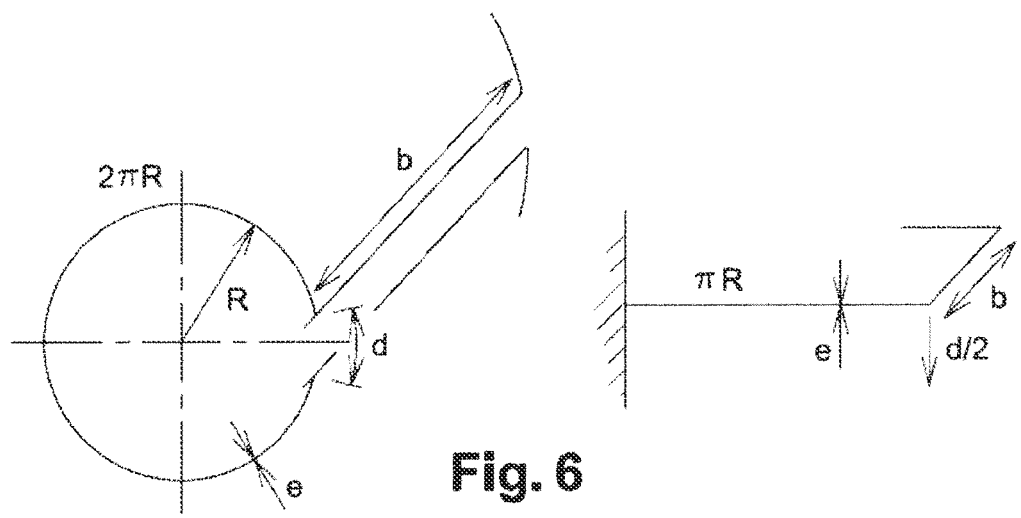
FIG. 6 represents the equivalencies of the section of the disclosed embodiments for calculating stresses according to the laws of the strength of materials.

FIG. 6 represents this hypothesis, on the one hand with the cylinder of length b and opening d, and on the other hand, the secured strip with a deflection b/2.

Taking as an example an aircraft section in which:
the radius is R=2150 mm, which corresponds to a beam length of about 6 m,
the length is b=10,000 mm,
the spread is d=500 mm, which corresponds to a beam deflection of 250 mm, and
the average skin thickness is 2.5 mm (thickness from 1.6 to 3 mm),
and considering the fact that the length of the beam is large and its thickness is very small, then the inertia of the beam is low (since it is not further stiffened by the internal structure). For a beam width of 10,000 mm, a force of 4 N is sufficient to reach the desired deflection of 250 mm, which is extremely small. The deflection v is given by the following strength of materials formula:

$$V = FL^3/(3EI) \text{ or } F = 3EIV/L^3$$

wherein $$V = 250 \text{ mm}$$

$$L = \pi R = 6750 \text{ mm}$$

$$E = \text{Young's modulus of the strip}$$
$$= 130 \text{ Gpa}$$
$$= 130,000 \text{ Mpa}$$
$$= 130,000 \text{ N/mm}^2$$

$$I = \text{inertia} = be^3/12 = 13,000 \text{ mm}^4$$

Numerical application give F=4 N, which is extremely low. The shear stress produced is $$\tau = F/S = F/(be) << 1 \text{ Mpa}$$

The maximum bending stress produced is $$\sigma = M/2I/e = FLe/(2I) = 3 \text{ Mpa}$$

The values of these stresses are very far from the allowable stress limits, which are greater than 100 Mpa. The spreading of the section at the cut is accordingly feasible without harm to the section.

In other respects, sensitivity analysis shows that the force to be applied to spread the edges of the section is inversely proportional to the cube of the radius of the section. Thus, for a diameter of 2×R=4300 mm, the force is 1.5 N. This analysis also shows that the force to be applied is inversely proportional to the cube of the thickness. Thus, for a skin 5 mm thick, the force is 33 N. The stresses applied accordingly increase with thickness (5 Mpa of deflection maximum).

After installation of the systems and structures in the section, the section must be closed up by a longitudinal overlap joint. This closure is accomplished by recombining the two margins of the section by applying a mechanical force around the section. The mechanical force is applied until the final diameter of the section is obtained, in other words the diameter corresponds to the diameter chosen for the fuselage design.

As explained above, the diameter after reassembly, i.e. the final diameter of the section, is considerably smaller than the manufactured diameter in order to compensate for the length lost by the overlapped area.

Figure 7:
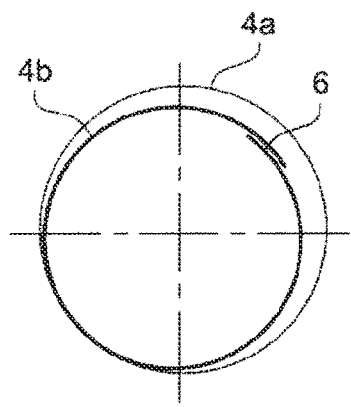
FIG. 7 represents a cross section of the section of the disclosed embodiments after reassembly and joining.

In FIG. 7, a cross section of a section is shown after reassembly. This figure shows the initial section 4a before making the cut, and the final section 4b after reassembly. This section 4b has an overlap area 6 in which the edges of the section are superimposed to permit them to be joined. It can be seen in this figure that the section after reassembly has a diameter smaller than the diameter of the initial section.

Figure 8:
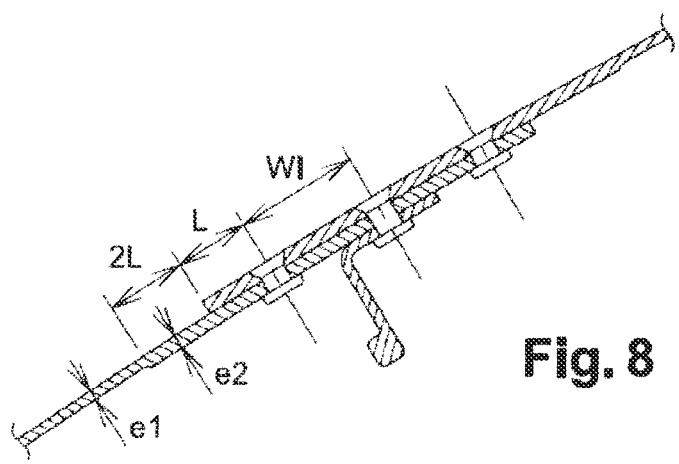
FIG. 8 illustrates an example of an overlap area according to the disclosed embodiments.

The joining of the two edges, i.e. the fastening of the two edges on top of one another, is accomplished by means of a longitudinal joint. Like all traditional longitudinal joints, this longitudinal joint can have three rows of fastening elements. The diameter $\Phi$ of the fasteners is typically 4 mm. The rules of aeronautic joints impose a spacing between two fasteners of W=5$\Phi$, and a distance from the margins of L=2.5$\Phi$. The overlap area in the disclosed embodiments can accordingly have a typical length of the order of L+W+W+L, or 15Φ=75 mm. An example of such an overlap is shown in FIG. 8, The result of this analysis is that for a final section diameter $D_{design}$, the initial section, i.e. the section manufactured in one piece, must have the following diameter:

$$D_{manufactured} = D_{design} + 15\Phi/\pi$$

The method of the disclosed embodiments can also integrate a perimeter defect, in other words a manufacturing tolerance T between two sections made in one piece. This manufacturing tolerance T permits perimeter defects to be absorbed during the overlapping of the two edges. To do this, the perimeter of the section to be manufactured is:

$$P_{manufactured} = P_{design} + 15\Phi + T$$

For the same reasons as for the spreading, the reassembly of the section entails a stress. This stress is a compressive stress. However, the stress is small compared to the stress applied during the spreading of the margins (75 mm of overlap versus 500 mm of spread). The reassembly of the section is accordingly feasible without harm to the section.

The invention claimed is:

1. A method for manufacturing a part of a fuselage of an aircraft, the said part of a fuselage comprising at least two fuselage sections each made of composite material, the method comprising the successive steps of:
    performing a longitudinally cut in a first single-piece fuselage section made of composite material so as to form therein an edge on each side of the cut, the cut being made linearly through the entire thickness of the first single-piece fuselage section;
    spreading apart the edges;
    reassembling the first single-piece fuselage section and making a longitudinal joint, wherein the longitudinal joint is made by bringing the edges together and fastening them, a diameter of the first single-piece fuselage section after performing the cut being inferior to a diameter of the first single-piece fuselage section before performing the cut; and
    forming the said part of the fuselage by assembling the first single-piece fuselage with a second single-piece fuselage section made of composite material, the diameter of the first single-piece fuselage section after performing the cut being equal to a diameter of the second single-piece fuselage section.

2. The method according to claim 1, wherein the cut is made on a lateral area of the first single-piece fuselage section.

3. The method according to claim 1, wherein supplementary cuts are made to obtain a cut off piece that forms a mini-panel.

4. The method according to claim 1, wherein the longitudinal joint is made by bringing the two edges together and fastening them with said edges overlapping.

5. The method according to claim 1, comprising an intermediate step of installing internal systems and/or structural elements and/or means of installing these elements into the first single-piece fuselage section through the cut.

6. The method according to claim 1, wherein the diameter of the first single-piece fuselage section before being cut is substantially: $D_{manufactured} = D_{design} + 15\phi/\pi$, wherein $D_{design}$ is the diameter of the first single-piece fuselage section after reassembly and $\phi$ is a diameter of fastening elements.

7. The method according to claim 6, wherein the diameter of the first single-piece fuselage section before being cut is determined so as to integrate a manufacturing tolerance (T).

8. An aircraft fuselage section of composite material, made in accordance with the method of claim 1.

9. An aircraft having at least one section made in accordance with the method of claim 1.

* * * * *